Patented Jan. 26, 1954

2,667,469

UNITED STATES PATENT OFFICE 2,667,469

VINYL ESTERS OF HYDROCARBONSULFONIC ACIDS AND POLYMERS THEREOF

John C. Sauer, Wilmington, Del., assignor to E. I. du Pont de Nemours and Company, Wilmington, Del., a corporation of Delaware No Drawing. Application February 19, 1951, Serial No. 211,809

22 Claims. (Cl. 260—79.3)

This invention relates to new compositions of matter and to their preparation. More particularly this invention relates to new monomeric unsaturated sulfonic esters, to their preparation and to polymers thereof.

Monomeric vinyl sulfonic acids, i. e., compounds of the formula

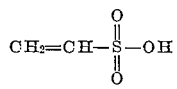

in which the vinyl group is directly attached to the sulfur atom of the sulfonic acid radical, their salts and esters, and their polymers are known. However, monomeric vinyl esters of hydrocarbonsulfonic acids, i. e., compounds in which the vinyl group is separated from the sulfur atom of the sulfonic radical by an oxygen atom have not hitherto been known. Polymers having recurring vinyl alcohol groups and vinyl sulfonic ester units in which the vinyl group is attached to the sulfur atom through an oxygen linkage have hitherto been prepared only by partially esterifying a preformed polyvinyl alcohol with a sulfonyl chloride. Heretofore, no polymeric products have been obtained by polymerization of a vinyl ester of a hydrocarbonsulfonic acid. Neither monomers nor homopolymers of vinyl esters of hydrocarbonsulfonic acids have been known prior to the present invention.

It is an object of this invention to provide new and useful compositions of matter. Another object is to provide novel monomeric unsaturated sulfonic esters and their polymers. A further object is to provide a method for preparing novel monomeric vinyl esters of hydrocarbonsulfonic acids, which monomers are useful as chemical intermediates and as ingredients of polymers. A still further object is to provide novel polymers of vinyl esters of hydrocarbonsulfonic acids. Other objects will appear hereinafter.

These objects are accomplished by the invention of new chemical compounds, the vinyl esters of hydrocarbonsulfonic acids. The vinyl esters of hydrocarbonsulfonic acids of this invention are also designated herein as vinyl hydrocarbonsulfonates having the general formula

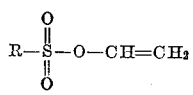

wherein R is a monovalent hydrocarbon radical directly joined to the sulfur atom of the sulfonic radical and the vinyl group is separated from the sulfur atom of the sulfonic radical by an oxygen atom. This invention also provides novel polymeric products obtained by polymerizing these new vinyl esters of hydrocarbonsulfonic acids, including homopolymers and copolymers thereof. The novel polymeric products of this invention have the sulfur atom of the hydrocarbonsulfonyl group, $RSO_2-$, attached through oxygen to the polymeric carbon chain and are free from hydroxyl groups attached directly to the polymeric carbon chain.

These new vinyl esters of hydrocarbonsulfonic acids are prepared by contacting a hydrocarbonsulfonic acid having the formula $R-SO_3H$, wherein R is a monovalent hydrocarbon radical, with acetylene at a temperature of 0° to 150° C. in the presence of a mercury compound as catalyst and an ether as reaction medium.

A preferred method of preparing the monomeric vinyl hydrocarbonsulfonates of this invention comprises contacting a mixture of a hydrocarbonsulfonic acid of the formula $RSO_3H$, in which R is an aliphatic, cycloaliphatic or aromatic monovalent hydrocarbon radical having 1 to 18 carbon atoms, with acetylene in the presence of 0.1 to 10%, based on the weight of the sulfonic acid, of a mercury catalyst, e. g., yellow mercuric oxide, and in the presence of an ether, e. g., dioxane as reaction medium at a temperature between 0° and 150° C., preferably at 20° to 50° C. In order to avoid explosive decomposition of the vinyl hydrocarbonsulfonates, it is essential that the monomer not be overheated, i. e., not heated above 150° C. Vinyl methanesulfonate decomposes vigorously at 175° C. under atmospheric pressure, even in an atmosphere of nitrogen.

While the reaction can be carried out under either atmospheric or superatmospheric pressure, it is preferable to maintain an acetylene pressure of 100 to 250 lb./sq. in during the reaction. The reaction is continued until the absorption of acetylene ceases. The resulting vinyl hydrocarbonsulfonate is isolated from the reaction mixture by conventional methods, such as, for example, by fractional distillation after any unreacted sulfonic acid has been removed by treatment with aqueous alkali carbonate. Because of the possibility of explosive decomposition, distillation under a very high vacuum is recommended.

The monomeric vinyl hydrocarbonsulfonates can be polymerized by conventional addition polymerization methods in the presence of light, ionic initiators or free radical type addition polymerization initiators. If desired, the vinyl hydrocarbonsulfonate can be copolymerized with another ethylenically unsaturated compound capable of undergoing addition polymerization.

The ordinary grades of hydrocarbonsulfonic acids and commercially available acetylene are satisfactory for use in the process of this invention.

This invention is further illustrated by the following examples in which the proportions of ingredients are expressed in parts by weight unless otherwise noted.

*Example I*

Into a pressure vessel which has been swept out with deoxygenated nitrogen are charged 100 parts of benzenesulfonic acid, 50 parts of dioxane and 5 parts of yellow mercuric oxide. The pressure vessel is closed, cooled in a mixture of solid carbon dioxide and methanol, evacuated and acetylene introduced until a pressure of 100 lb./sq. in. is obtained. The reaction vessel is then placed in a shaking apparatus equipped with heating coils and the contents of the reactor heated at 55–65° C. during a period of 8.5 hours. During this period acetylene is injected intermittently to maintain a pressure of 100–200 lb./sq. in. At the end of this reaction period, the absorption of acetylene has ceased. The reaction vessel is cooled, excess pressure is vented and the contents discharged.

The reaction mixture is dissolved in diethyl ether, washed thoroughly with aqueous potassium carbonate solution, and the ether layer is dried over anhydrous potassium carbonate. After separating from the drying agent, the ether layer is distilled. After removal of the ether, the residual oil is distilled rapidly through a short column in order to quickly remove the vinyl benzenesulfonate from the non-distillable materials present as impurities. Most of the distillate boils at a temperature of about 110° C. at 10 mm. pressure. This distillate is then redistilled through an efficient fractionating column, and the following fractions are isolated.

| Fraction | Boiling Point, ° C./mm. Hg | Amount, Parts by Weight | Refractive Index, $n_D^{25}$ |
|---|---|---|---|
| 1 | 78.5–87.5/0.5 | 1.9 | 1.5019 |
| 2 | 87.5–93/0.5 | 2.3 | 1.5117 |
| 3 | 93–95/0.5 | 3.5 | 1.5146 |
| 4 | 95/0.5 | 29 | 1.5161 |
| 5 | 98–101/1–1.5 | 29.2 | 1.5161 |

Fractions 4 and 5 are relatively pure vinyl benzenesulfonate. The infrared spectrum of this material indicates an olefinic double bond of the $CH_2=CH-$ type. This vinyl benzene sulfonate readily absorbs bromine and is catalytically hydrogenated to ethyl benzenesulfonate having a boiling point of 107° C. at 0.9 mm. and a refractive index, $n_D^{25}$, of 1.5067. An authentic sample of ethyl benzenesulfonate distills at 107° C. at 0.9 mm. and has a refractive index, $n_D^{25}$, of 1.5070. Using a molecular refractivity value of 9.53 for the $SO_3$ function in sulfonate esters (determined from an authentic sample of ethyl benzenesulfonate), the molecular refractivity for vinyl benzenesulfonate is found to be 45.33 (based on a refractive index of 1.5162 and a density of 1.2263). The theoretical molecular refractivity for vinyl benzenesulfonate is similarly found to be 45.28.

*Anal.*—Calculated for vinyl benzenesulfonate, $C_8H_8O_3S$: C, 52.2%; H, 4.3%; S, 17.4%; Saponification Number, 306. Found: C, 52.66%, 52.96%; H, 5.07%; 4.82%; S, 17.17%, 17.57%; Saponification Number, 317.8, 318.8.

*Example II*

Five parts of vinyl benzenesulfonate and 0.1 part of 1,1'-azodicyclohexanecarbonitrile are heated at 100° C. for 4 hours. During this time the monomer polymerizes to a soft, sticky extremely viscous polymer of vinyl benzenesulfonate.

*Example III*

The addition of 0.1 part of boron trifluoridemethanol (1:1 mole ratio) addition compound to 2 parts of vinyl benzenesulfonate causes polymerization to begin immediately with liberation of heat of reaction, and within a period of less than one minute the vinyl benzenesulfonate is polymerizing with great vigor. The resulting polymer is very viscous.

*Example IV*

A pressure reactor of the type used in Example I is charged with 50 parts of butanesulfonic acid, 100 parts of dioxane and 4 parts of yellow mercuric oxide. The reaction mixture is agitated and heated for 4 hours at 20–33° C. while the acetylene pressure is maintained at 100–150 lb./sq. in. by intermittent acetylene injection.

The reaction mixture is worked up in an analogous manner to that described in Example I and there is isolated 27.2 parts of crude vinyl butanesulfonate boiling at 35–79° C./1 mm. This material is combined with 11.4 parts of crude vinyl butanesulfonate obtained in a similar run. The combined material is then carefully purified by fractional distillation. There is obtained 18.0 parts of highly purified vinyl butanesulfonate of which the heart-cut distills at 98–98.2°/15 mm., $n_D^{25}$, of 1.4390.

*Anal.*—Calculated for $C_6H_{12}O_3S$: S, 19.5%. Found: S, 19.40%, 19.36%.

*Example V*

Using the apparatus and procedure described in Example I, the pressure reactor is charged with 60 parts of p-toluenesulfonic acid, 50 parts of dioxane and 4 parts of yellow mercuric oxide. Acetylene is introduced and the reaction mixture heated at 32–55° C. during a period of 3.4 hours with the acetylene pressure maintained at 100–250 lb./sq. in. by the intermittent addition of acetylene.

From the crude reaction mixture there is obtained by the process described in Example I, 39.6 parts of vinyl p-toluenesulfonate boiling at 106–111° C./0.3 mm., and having a refractive index, $n_D^{25}$, of 1.5188.

Calculated for $C_9H_{10}O_3S$: C, 54.6%; H, 5.05%; S, 16.1%. Found: C, 55.34%, 55.04%; H, 5.41%, 5.32%; S, 15.96%, 16.07%.

*Example VI*

A pressure reactor of the type used in the preceding examples is charged with 125 parts of methanesulfonic acid, 100 parts of dioxane and 6 parts of yellow mercuric oxide by the procedure described in the previous examples. The reaction mixture is heated at 25–60° C. for 2 hours while the pressure is maintained at 100–170 lb./sq. in. by the intermittent injection of acetylene.

The crude reaction mixture is removed from the reactor and worked up as described in the preceding examples. There is obtained 57.5 parts of vinyl methanesulfonate boiling at 70°

C./9 mm., and having a refractive index, $n_D^{25}$, of 1.4278.

*Anal.*—Calculated for $C_3H_6O_3S$: C, 29.5%; H, 4.9%; S, 26.3%; mol. wt., 122. Found: C, 30.10%, 30.06%; H, 5.12%, 5.10%; S, 26.57%, 26.62%; Saponification Number 490.1, 492.2, (corresponding to a mol. wt. of 115).

Example VII

A pressure reactor of the type used in the preceding examples is charged with 130 parts of methanesulfonic acid, 6 parts of yellow mercuric oxide and 77 parts of dibutyl ether by the procedure described in the previous examples. Acetylene is introduced and reaction begins immediately. The temperature is gradually raised from below 0° C. to 60° C. during 3 hours and the acetylene pressure is maintained at 100–170 lb./sq. in.

The reaction mixture is washed with dilute aqueous potassium carbonate solution, and the organic layer is separated and dried over anhydrous potassium carbonate. After removal of the dibutyl ether, the residual liquid distills almost entirely at 64–65° C./5 mm. The yield of vinyl methanesulfonate is 117 parts and it has a refractive index, $n_D^{25}$, of 1.4271.

Example VIII

A mixture of 10 parts of acrylonitrile and 2 parts of vinyl methanesulfonate is added to 150 parts of water at room temperature. To this mixture is then added, with stirring, a mixture of 0.2 part of patassium persulfate and 0.4 part of sodium bisulfite. A solid polymer starts to precipitate almost immediately. Stirring is continued without any external heating for 4 hours, after which the precipitate is filtered, washed with water and dried at 40° C. under reduced pressure. A yield of 11 parts of acrylonitrile/vinyl methanesulfonte copolymer is obtained. Sulfur analysis of the copolymer indicates a vinyl methanesulfonate content of 13%, by weight. Clear, colorless films of this copolymer are cast from a 20% solution in dimethylformamide.

Example IX

A mixture of 15 parts of styrene, 15 parts of vinyl methanesulfonate and 0.2 part of alpha,-alpha'-azodiisobutyronitrile is heated at 60–70° C. for 4 hours in an atmosphere of nitrogen. Another 0.2 part of alpha,alpha'-azodiisobutyronitrile is added and heating continued for an additional 8 hours. The resulting viscous polymer is dissolved in benzene and precipitated as a white powder by addition of methanol. The yield of dry copolymer of styrene and vinyl methanesulfonate is 16.5 parts. Sulfur analyses of this copolymer indicate that it contains 8.5% of vinyl methanesulfonate by weight.

Example X

Sixty-eight parts of vinyl acetate and 17 parts of vinyl methanesulfonate are added to a pressure reactor containing 85 parts of water, 2.1 parts of the sodium salt of the sulfate of technical dodecyl alcohol, 0.43 part of ammonium persulfate and 0.14 part of sodium bisulfite. The reactor is swept out with nitrogen, closed and agitated until the contents are emulsified. This emulsion is heated at 35° C. with good agitation for 24 hours. The product is stripped with steam until free of unreacted monomers and is then coagulated. The coagulum is washed rapidly with water until essentially free of emulsifying agent and dried at 50° C. under reduced pressure. The dry copolymer of vinyl acetate and vinyl methanesulfonate, amounting to 50 parts, is a clear, soft resin resembling low molecular weight polyvinyl acetate in appearance and solubility. A portion of the dry polymer is dissolved in pure acetone and filtered to remove last traces of inorganic impurities. Excess solvent is distilled from the filtrate and the polymer dried at 50° C. under 1 to 2 mm. pressure. Sulfur analyses of this copolymer indicate that it contains approximately 15.8% vinyl methanesulfonate. On standing for approximately three weeks at room temperature, the polymer becomes insoluble in ordinary polyvinyl acetate solvents. The polymer is rapidly insolubilized by heating at approximately 100° C. but darkens badly at this temperature.

Example XI

A pressure reactor is charged with 11.5 parts of vinyl methanesulfonate, 100 parts of benzene and 0.1 part of alpha-alpha'-azobis(alpha,-gamma-dimethylvaleronitrile) and pressured to 1000 atmospheres with ethylene at 50–55° C. After three hours reaction a grainy slurry is obtained which is coagulated with methanol and the coagulum filtered, washed with methanol and air dried. The yield of ethylene/vinyl methanesulfonate copolymer is 5 parts. Sulfur analyses indicate that this copolymer contains 8% vinyl methanesulfonate. The polymer has an inherent viscosity of 0.13. Films can be pressed from this copolymer.

The examples have illustrated the products of this invention by specific reference to certain monomeric vinyl hydrocarbonsulfonates. However, the invention is generic to all vinyl hydrocarbonsulfonates having the formula

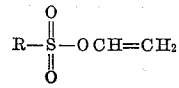

wherein R is a monovalent hydrocarbon radical, preferably of 1 to 18 carbon atoms. Vinyl hydrocarbonsulfonates of the above formula in which R is an alkyl, cycloalkyl, i. e. saturated hydrocarbon, or aryl radical of 1 to 18 carbon atoms are preferred for their general usefulness in various applications. Such esters in which the R is a monovalent hydrocarbon radical of 1 to 8 carbon atoms are especially useful and are particularly preferred products of this invention.

Other specific hydrocarbonsulfonic acids which can be reacted with acetylene by the process of this invention to give the corresponding vinyl hydrocarbonsulfonates include the alkanesulfonic acids such as, for example, ethane-, n-hexane-, n-octane-, and octadecanesulfonic acids; the cycloalkanesulfonic acids such as, for example, cyclopentane-, cyclohexane- and methylcyclohexanesulfonic acids; and aromatic hydrocarbonsulfonic acids such as, for example, naphthalene- and xylenesulfonic acids. Thus there are obtained the vinyl esters of alkanesulfonic acids, such as vinyl ethanesulfonate, vinyl n-hexanesulfonate, vinyl n-octanesulfonate, and vinyl octadecanesulfonate; the vinyl esters of cycloalkanesulfonic acids, such as vinyl cyclopentanesulfonate, vinyl cyclohexanesulfonate and vinyl methylcyclohexanesulfonate; and the vinyl esters of aromatic hydrocarbonsulfonic acids, such as vinyl naphthalenesulfonate and vinyl xylenesulfonate.

The examples have illustrated the process of this invention with dioxane and dibutyl ether employed as the reaction medium. However, other ethers capable of oxonium salt formation with sulfonic acids can be used. Specific examples of such other ethers include isopropyl ether, n-hexyl ether, and the ethyleneglycol diethers. The oxonium salt formation of the sulfonic acids with dioxane is shown by the following experiment. Methanesulfonic acid, boiling at 131° C./0.5 mm. and having a neutral equivalent of 96.5 (theoretical 96), forms a hygroscopic, crystalline compound with dioxane. A portion of the crystalline material is rinsed with carbon tetrachloride, filtered rapidly by suction and dried over night at room temperature in a vacuum desiccator over anhydrous calcium chloride. This crystalline compound analyzes for 1 mole of dioxane and 2 moles of methanesulfonic acid, having a neutral equivalent of 138.1 and 138.3, in duplicate determinations, as compared to a theoretical neutral equivalent of 140.

Yellow mercuric oxide is especially suitable as catalyst in the process of this invention. However, other mercury catalysts, such as the mercuric salts of strong acids useful in the addition of acetylene to carboxylic acid esters, e. g., mercuric sulfate and mercuric phosphate, can be used.

The monomeric vinyl hydrocarbonsulfonates of this invention can be polymerized by conventional addition polymerization methods to homopolymers and to copolymers with other ethylenically unsaturated compounds capable of addition polymerization. In addition to the specific polymerization initiators mentioned in Examples II and III, the polymerization can be initiated by actinic light, ionic initiators, e. g., boron trifluoride, aluminum chloride, and the like; peroxy compounds, e. g., potassium persulfate, benzoyl peroxide, t-butyl hydroperoxide, diethyl peroxide, and the like; and azo initiators, such as those disclosed in Hunt, U. S. Patent 2,471,959, e. g., alpha,alpha'-azodiisobutyronitrile, alpha,-alpha'-azodiisobutyramide, alpha,alpha'-azobis-(alpha,gamma-dimethylvaleronitrile) and the like. The polymerization can be carried out over a wide range of initiator concentration and polymerization temperature. Initiator concentrations ranging from 0.01 to 10% of the weight of the monomer are operable. Polymerization temperatures ranging from 0° to 150° C. are in general operable. The specific temperature employed in any specific case depends on the particular initiator and particular unsaturated monomer being employed. Polymerization temperatures ranging from 20° to 50° C. are generally preferred.

In addition to the specific polymers mentioned in the examples, the polymers of this invention include polymers of vinyl methanesulfonate, vinyl butanesulfonate, vinyl p-toluene-sulfonate, vinyl cyclohexanesulfonate, and the like. This invention also includes copolymers containing at least 5% by weight of vinyl hydrocarbonsulfonates with other ethylenically unsaturated compounds capable of addition polymerization such as, for example, olefins, e. g., ethylene and isobutylene; diolefins, e. g., butadiene; substituted ethylenes, e. g., tetrafluoroethylene, styrene; vinyl esters, e. g., vinyl chloride, vinylidene chloride, vinyl fluoride, and vinyl acetate; acrylic and alpha-alkylacrylic compounds, e. g., acrylic acid, methyl methacrylate, methacrylanilide, acrylonitrile, and the like.

The monomeric vinyl hydrocarbonsulfonates of this invention are particularly useful as chemical intermediates. For example, they can be reduced to the corresponding ethyl hydrocarbonsulfonates. They are also useful for polymerization and copolymerization to products which are useful as adhesives, coating compositions, plasticizers, and the like.

As many apparently widely different embodiments of this invention may be made without departing from the spirit and scope thereof, it is to be understood that this invention is not limited in the specific embodiments thereof except as defined in the appended claims.

I claim:

1. A method for preparing a vinyl ester of a hydrocarbonsulfonic acid which comprises contacting a hydrocarbonsulfonic acid selected from the class consisting of saturated hydrocarbonsulfonic acids and aromatic hydrocarbonsulfonic acids with acetylene at a temperature of 0° to 150° C. in the presence of a mercury compound as catalyst and an ether as reaction medium.

2. The process as set forth in claim 1 in which said mercury compound is mercuric oxide.

3. The process as set forth in claim 1 in which said hydrocarbonsulfonic acid is an aromatic hydrocarbonsulfonic acid.

4. A monomeric vinyl ester of a hydrocarbonsulfonic acid having the formula

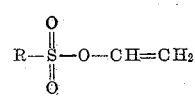

wherein R is a monovalent hydrocarbon radical selected from the class consisting of aryl and saturated hydrocarbon radicals.

5. A monomeric vinyl ester of a hydrocarbonsulfonic acid as set forth in claim 4 wherein R is an aryl radical.

6. Monomeric vinyl methanesulfonate having the formula

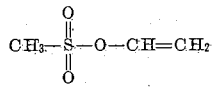

7. Monomeric vinyl butanesulfonate having the formula

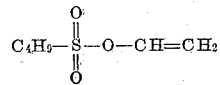

8. Monomeric vinyl benzenesulfonate having the formula

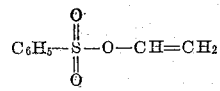

9. Monomeric vinyl p-toluenesulfonate having the formula

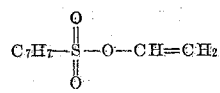

10. A homopolymer of a monomeric vinyl ester of a hydrocarbonsulfonic acid having the formula

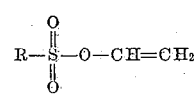

wherein R is a monovalent hydrocarbon radical selected from the class consisting of aryl and saturated hydrocarbon radicals.

11. A homopolymer of a monomeric vinyl ester of a hydrocarbonsulfonic acid as set forth in claim 10 wherein R is an aryl radical.

12. A homopolymer of a monomeric vinyl ester of a hydrocarbonsulfonic acid as set forth in claim 10 wherein R is an alkyl radical.

13. A copolymer of acrylonitrile and a monomeric vinyl ester of a hydrocarbonsulfonic acid having the formula

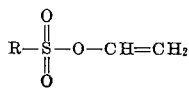

wherein R is a monovalent hydrocarbon radical selected from the class consisting of aryl and saturated hydrocarbon radicals, said copolymer containing at least 5% by weight of said vinyl ester of a hydrocarbonsulfonic acid.

14. A copolymer of acrylonitrile and monomeric vinyl methanesulfonate, said copolymer containing at least 5% by weight of said vinyl methanesulfonate.

15. A method for preparing a polymer of a vinyl ester of a hydrocarbonsulfonic acid which comprises contacting at a temperature of 0° to 150° C. with an addition polymerization initiator, a monomeric vinyl ester of a hydrocarbonsulfonic acid having the formula

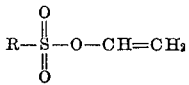

wherein R is a monovalent hydrocarbon radical selected from the class consisting of aryl and saturated hydrocarbon radicals.

16. A monomeric vinyl ester of a hydrocarbonsulfonic acid having the formula

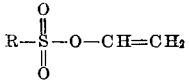

wherein R is a monovalent saturated hydrocarbon radical.

17. A monomeric vinyl ester of a hydrocarbonsulfonic acid having the formula

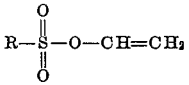

wherein R is an alkyl radical.

18. A method for preparing a vinyl ester of a hydrocarbonsulfonic acid which comprises contacting a saturated hydrocarbonsulfonic acid with acetylene at a temperature of 0° to 150° C. in the presence of a mercury compound as catalyst and an ether as reaction medium.

19. A method for preparing a vinyl ester of a hydrocarbonsulfonic acid which comprises contacting an alkanesulfonic acid with acetylene at a temperature of 0° to 150° C. in the presence of a mercury compound as catalyst and an ether as reaction medium.

20. A method for preparing a copolymer of a vinyl ester of a hydrocarbonsulfonic acid which comprises contacting at a temperature of 0° to 150° C. with an addition polymerization initiator, a monomeric ethylenically unsaturated polymerizable compound and a monomeric vinyl ester of a hydrocarbonsulfonic acid having the formula

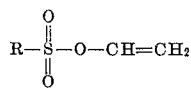

wherein R is a monovalent hydrocarbon radical selected from the class consisting of aryl and saturated hydrocarbon radicals.

21. A method for preparing a copolymer of a vinyl ester of a hydrocarbonsulfonic acid which comprises contacting at a temperature of 0° to 150° C. with an addition polymerization initiator, acrylonitrile and a monomeric vinyl ester of a hydrocarbonsulfonic acid having the formula

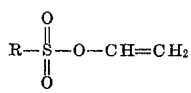

wherein R is a monovalent hydrocarbon radical selected from the class consisting of aryl and saturated hydrocarbon radicals.

22. A method for preparing a copolymer of a vinyl ester of a hydrocarbonsulfonic acid which comprises contacting at a temperature of 0° to 150° C. with an addition polymerization initiator, acrylonitrile and monomeric vinyl methanesulfonate.

JOHN C. SAUER.

References Cited in the file of this patent

UNITED STATES PATENTS

| Number | Name | Date |
|---|---|---|
| 2,348,705 | Alderman | May 16, 1944 |
| 2,395,347 | Sharkey | Feb. 19, 1946 |
| 2,531,468 | Reynolds | Nov. 28, 1950 |
| 2,531,469 | Reynolds | Nov. 28, 1950 |

OTHER REFERENCES

Berichte, vol. 53B, pages 1836–9 (1920).
Monomers, Vinyl Acetate, pages 3–11, Interscience Publishers, Inc., New York (1949).
Izard, Ind. & Eng. Chem., March 1949, pages 617–621.